United States Patent [19]

Kita et al.

[11] Patent Number: 4,759,324
[45] Date of Patent: Jul. 26, 1988

[54] INTAKE SYSTEM FOR ROTARY PISTON ENGINE

[75] Inventors: Tatsuya Kita; Hiroshi Sasaki; Nokuhiro Yamamoto, all of Hiroshima, Japan

[73] Assignee: Mazda Motor Corporation, Hiroshima, Japan

[21] Appl. No.: 946,327

[22] Filed: Dec. 24, 1986

[30] Foreign Application Priority Data

Dec. 27, 1985 [JP] Japan .................................. 60-298677
Dec. 27, 1985 [JP] Japan .................................. 60-298679

[51] Int. Cl.$^4$ ............................................. F02B 53/04
[52] U.S. Cl. ........................................ 123/216; 123/242
[58] Field of Search ....................... 123/216, 242, 316; 418/60

[56] References Cited

U.S. PATENT DOCUMENTS

| 3,528,084 | 9/1970 | Hohenlohe | 123/242 |
| 3,762,376 | 10/1973 | Eberle et al. | |
| 3,919,986 | 11/1975 | Goto | |
| 4,128,085 | 12/1978 | Kunii | |

FOREIGN PATENT DOCUMENTS

| 1576196 | 4/1970 | Fed. Rep. of Germany | 123/216 |
| 2161798 | 6/1973 | Fed. Rep. of Germany | 123/242 |
| 172429 | 10/1983 | Japan | 123/242 |
| 2144489 | 3/1985 | United Kingdom | 123/242 |

Primary Examiner—Michael Koczo
Attorney, Agent, or Firm—Fleit, Jacobson, Cohn & Price

[57] ABSTRACT

An intake system for three-rotor type rotary piston engine having first, second and third engine sections, and three rotors, the rotors being in 120-degree phase difference in terms of eccentric shaft rotation, a first communicating passage for communicating the working chamber in which the compression stroke is proceeding in the first engine section and the working chamber in which the intake stroke is proceeding in the second engine section, a second communicating passage for communicating the working chamber in which the compression stroke is proceeding in the second engine section and the working chamber in which the intake stroke is proceeding in the third engine section, and a third communicating passage for communicating the working chamber in which the compression stroke is proceeding in the third engine section and the working chamber in which the intake stroke is proceeding in the third engine section, each communicating passage being provided with a valve for controlling the openings thereof in accordance with the engine load. According to the present invention, there can be obtained an intake system for three-rotor type rotary piston engine capable of uniformly reducing the pumping loss in each engine section and drawing the same amount of intake air from the intake port to each engine section.

9 Claims, 8 Drawing Sheets

FIG.7 even if the communicating passages are provided in the intermediate housing between a first engine section and a second one and in that between the second engine section and a third one respectively, although the mixture gas in the working chamber in which the compression stroke is proceeding can be discharged from the first engine section to the second one and from the second engine section to the third one, the mixture gas in the working chamber in which the compression stroke is proceeding in the third engine section cannot be discharged to any engine sections. Therefore, pumping loss is caused by the compressive pressure in the third engine section and the amounts of the mixture gas drawn are different between the engine sections, and, as a result, since the the amounts of intake air sucked from the intake port are different between the engine sections, it is difficult to appropriately control the amount of fuel fed to each engine section.

INTAKE SYSTEM FOR ROTARY PISTON ENGINE

BACKGROUND OF THE INVENTION

The present invention relates to an intake system for a three-rotor type rotary piston engine, and more particularly to the intake system therefor capable of reducing pumping loss.

DESCRIPTION OF PRIOR ART

As disclosed in unexamined Japanese Patent Publication No. 172429/1983, there is known an intake system for a two-rotor type rotary piston engine intended to reduce the pumping loss by providing a communicating passage in a intermediate housing and a control valve in said communicating passage, said communicating passage communicating a working chamber formed in one of the engine sections in which the compression stroke is proceeding with a working chamber formed in the other engine section in which the intake stroke is proceeding and then alternatively communicating the latter in which the compression stroke is proceeding with the former in which the intake stroke is proceeding, said control valve controlling the opening of the communicating passage in accordance with the engine load and being controlled to be opened under the low load condition.

According to this prior art system, since, under the low load driving condition, more intake air and fuel mixture can be drawn into the working chamber in which the intake stroke is proceeding from the other working chamber through the communicating passage to reduce the negative pressure therein and any excess of the mixture gas can be discharged from the working chamber in which the compression stroke is proceeding into the other working chamber through the communicating passage, the amount of intake air drawn into the working chamber can be controlled in accordance with the engine load and the pumping loss can be reduced. Further, since the mixture gas discharged from the working chamber in which the compression stroke is proceeding is transferred to the other working chamber and does not flow backward to the intake passage to drain out of the system, the loss of fuel and the noise caused by drawing intake air are not serious at all.

However, although this solution proposed by the above prior art system can be effectively applied to the two-rotor type rotary piston engine in which two rotors are in 180-degree phase difference in terms of the eccentric shaft rotation angle, it is very difficult to apply it to the three-rotor type rotary piston engine in which three rotors are in 120-degree phase difference in terms of the eccentric shaft rotation angle, respectively.

More specifically, since the two rotors are in 180-degree phase difference in the two-rotor type rotary piston engine and the communicating passage is provided in the intermediate housing for separating two engine sections so as to be opened during the time period when the working chamber formed in one of the engine sections is from an intermediate stage of the intake stroke to the intermediate stage of the compression stroke, the working chamber in one engine section in which the compression stroke is proceeding is communicated with the working chamber in the other engine section in which the intake stroke is proceeding and then alternatively when the compression stroke is proceeding in the working chamber in the latter engine section, it is communicated with the working chamber in the former engine section, and as a result, the same amount of the mixture gas can be drawn into the working chamber in each engine section and the pumping loss can be reduced equally for both engine sections.

On the other hand, in case where two rotors are in 120-degree phase difference in two-rotor type rotary piston engine and where the communicating passages are provided in the intermediate housing, although, while one end opening of the communicating passage opens to the working chamber in one engine section in which the compression stroke is proceeding, the other end opening thereof opens to the working chamber in the other engine section in which the intake stroke is proceeding, when the latter end opening of the communicating passage opens to the working chamber in the latter engine section, the former end opening thereof is closed by the rotor of the former engine section. Similarily, in the three-rotor type rotary piston engine in which the three rotors are in 120-degree phase difference,

SUMMARY OF THE INVENTION

It is therefore an object of the present invention to provide an intake system for a three-rotor type rotary piston engine capable of effectively reducing the pumping losses in each engine section and equalizing the amount of the mixture gas drawn into each engine section and the amount of intake air sucked from an intake port of each engine section into each engine section.

According to the present invention, the above and other objects can be accomplished by an intake system for three-rotor type rotary piston engine consisting of first, second and third engine sections, a casing comprised of first, second and third rotor housings each of which is formed with an inner wall of trochoidal configuration, two intermediate housings respectively located between said first rotor housing and said second housing and between said second housing said third housing and two side housings respectively attached with said first rotor housing and said third rotor housing, each engine section having a rotor of substantially polygonal configuration planetarily rotatable in sliding contact with the inner wall of said rotor housing therein to define working chambers of cyclically variable volumes, said rotors being in 120-degree phase difference, and intake port means for introducing intake air into each engine section, said intake system comprising: first communicating passage means for communicating the working chamber in which the compression stroke is proceeding in the first engine section and the working chamber in which the intake stroke is proceeding in the second engine section, second communicating passage means for communicating the working chamber in which the compression stroke is proceeding in the second engine section and the working chamber in which the intake stroke is proceeding in the third engine section, third communicating passage means for communicating the working chamber in which the compression stroke is proceeding in the third engine section and the working chamber in which the intake stroke is proceeding in the first engine section, each communicating passage means being provided with valve means for controlling the openings thereof in accordance with the engine load.

In a preferred aspect of the present invention, said third communicating passage means comprises said first communicating passage means, said second communicating passage means and a crooked passage provided in the second rotor housing and communicating said first communicating passage means with said second communicating passage means and valve means for controlling the openings of said first communicating passage means and said second communicating passage means in accordance with the engine load, said valve means being provided in the first communicating passage means and the second communicating passage means respectively but not provided in the third communicating passage.

In another preferred aspect of the present invention, said third communicating passage means is constituted by said first communicating passage means, said second communicating passage means and one of a plurality of holes provided through the rotor of the second engine section in the vicinity of respective apex portions thereof each of said holes being capable of communicating the first communicating passage means and the second communicating passage means, its axis being parallel with the output shaft, and valve means for controlling the openings of the first communicating passage means and the second communicating passage means, said valve means being provided in the first communicating passage means and the second communicating passage means respectively.

The above and other objects and features of the present invention will become apparent from the following descriptions made with reference to the accompanying drawings.

DESCRIPTION OF THE PREFERRED EMBODIMENT

Figure 1:
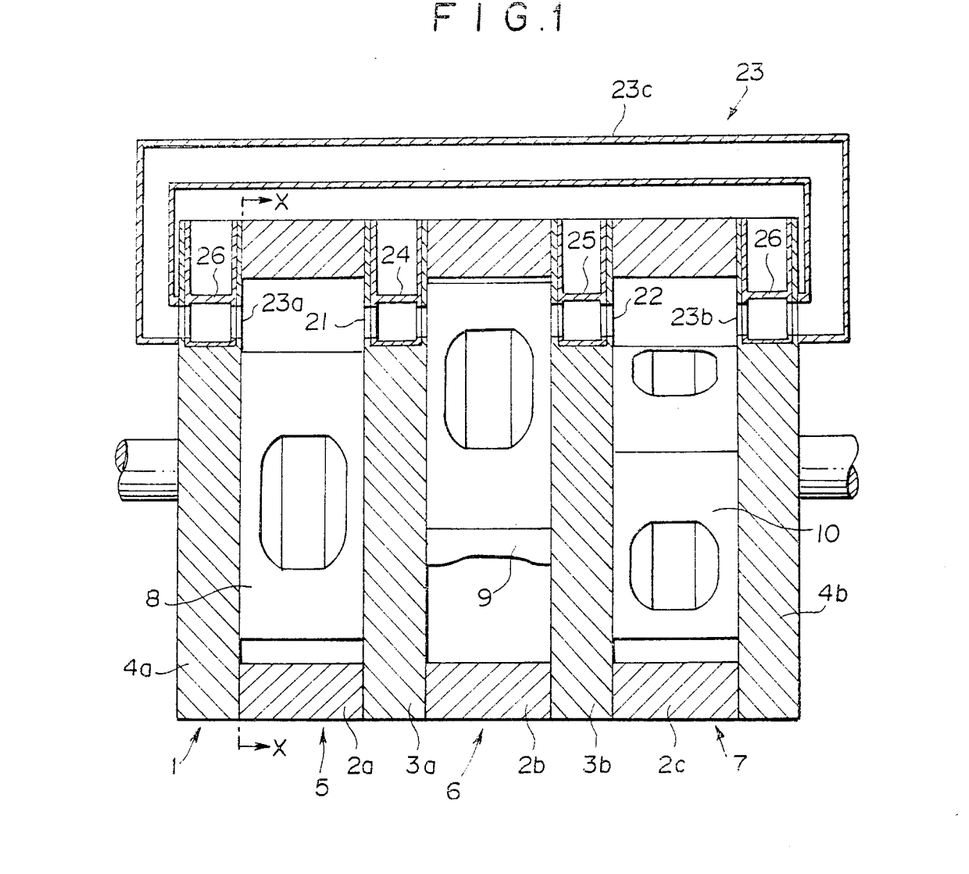
FIG. 1 is a schematic drawing showing a longitudinal cross-sectional view of a rotary piston engine having an intake system which is an embodiment of the present invention.
Figure 2:
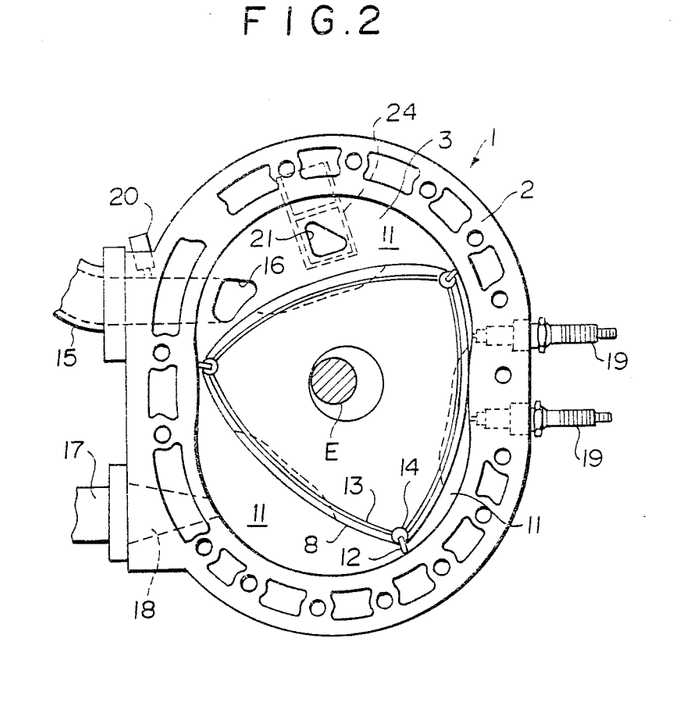
FIG. 2 is a schematic drawing showing a cross-sectional view taken along line X—X of FIG. 1.

Referring to FIGS. 1 and 2, there is shown a three-rotor type rotary piston engine having an intake system which is an embodiment of the present invention. The rotary piston engine has three rotor housings $2a$, $2b$ and $2c$ which are formed with inner walls of trochoidal configuration. An intermediate housing $3a$ is located between the rotor housings $2a$ and $2b$ to separate them one from the other and an intermediate housing $3b$ is located between the rotor housings $2b$ and $2c$ to separate them one from the other. The outsides of the rotor housings $2a$ and $2c$ are attached with side housings $4a$ and $4b$ respectively. Thus, the rotor housings $2a$, $2b$ and $2c$, the intermediate housings $3a$ and $3b$ and the side housings $4a$ and $4b$ constitute a casing 1 as well as a first engine section 5, a second engine section 6 and a third engine section 7.

In each of the engine sections 5, 6 and 7, a rotor cavity is defined and there is disposed a rotor 8, 9 or 10 of substantially triangular configuration in each rotor cavity of the engine sections 5, 6 and 7. The rotors 8, 9 and 10 are carried by an eccentric shaft E and have apex portions provided with apex seals 12 and corner seals 14. Further, the rotors 8, 9 and 10 are provided at their side surfaces with side seals 13. The rotors 8, 9 and 10 are rotatable planetarily with their apex seals 12 in sliding contact with the inner wall of the rotor housings $2a$, $2b$ and $2c$ and are in 120-degree phase difference with each other. The side seals 13 are maintained in sliding contact with the side housings $4a$ and $4b$ and the intermediate housings $3a$ and $3b$. Thus, in each of the rotor cavities in the engine sections 5, 6 and 7, there are defined working chambers 11 of whose volumes cyclically change as the rotors 8, 9 and 10 rotate.

The intermediate housings $3a$ and $3b$ and the side housngs $4a$ and $4b$ are formed with intake ports 16 communicated with an intake passage 15 so as to open to the working chamber 11 in which the intake stroke begins and proceeds in each of the engine sections 5, 6 and 7. Further, each of the rotor housings $2a$, $2b$ and $2c$ is formed with an exhaust port 18 communicated with an exhaust passage 17 so as to open to the working chamber 11 in which the exhaust stroke begins and proceeds and is provided with an ignition plug 19 so as to ignite the intake air and fuel mixture when the working chamber 11 is at the end of the compression stroke. The reference numeral 20 designates a fuel injection nozzle.

Further, there are provided a first communicating passage 21 for communicating the working chamber 11 in which the compression stroke is proceeding in the first engine section 5 and the working chamber 11 in which the intake stroke is proceeding in the second engine section 6, and a second communicating passage 22 for communicating the working chamber 11 in which the compression stroke is proceeding in the second engine section 6 and the working chamber 11 in which the intake stroke is proceeding in the third engine section 7, and a third communicating passage 23 for communicating the working chamber 11 in which the compression stroke is proceeding in the third engine section 7 and the working chamber 11 in which the intake stroke is proceeding in the first engine section 5. The first communicating passage 21 is formed in the intermediate housing 3a to open to both the first engine section 5 and the second engine section 6, and the second communicating passage 22 is formed in the intermediate housing 3b to open to both the second engine section 6 and the third engine section 7. The third communicating passage 23 comprises, in this embodiment, a hole 23a formed through the side housing 4a, a hole 23b formed through the side housing 4b and a passage 23c for connecting said holes 23a and 23b. The openings of the first, second and third communicating passages 21, 22 and 23 are located at the substantially the same positions with respect to the longitudinal direction of an output shaft so that each of the openings is opened at an intermediate stage of the intake stroke and closed at an intermediate stage of the compression stroke as each of the rotors 8, 9 and 10 rotates.

The first communicating passage 21, the second communicating passage 22 and the holes 23a and 23b of the third communicating passage 23 are respectively formed with control valves 24, 25 and 26 for controlling the opening of the communicating passages 21, 22 and 23 in accordance with the engine load. Each of these control valves 24, 25 and 26 consists of, for example, a rotary valve and is mechanically interlocked with an accelerator pedal or is driven by proper electrical means and an actuator in accordance with the opening of the accelerator so that their openings can be controlled in accordance with the engine load. The opening of each of the control valves 24, 25 and 26 is set so that it is increased under low load condition and that it is decreased as the engine load becomes higher and that it is fully closed under heavy load condition close to full load condition. As the control valve, a butterfly valve may be employed in place of the rotary valve.

As described above, since the amount of the mixture gas drawn into each engine section can be controlled by controlling the opening of respective control valves 24, 25 and 26, it is unnecessary to control the opening of a throttle valve (not shown) provided in the intake passage 15 in accordance with the engine load. For this reason, the opening of the throttle valve is set so as to be relatively larger even under low load condition.

According to the above described intake system for three-rotor type rotary piston engine, when the engine is operated under high load condition, since the control valves 24, 25 and 26 in the communicating passages 21, 22 and 23 are closed, the engine is operated in the ordinary manner and the amount of intake air required for high load condition condition is ensured. On the other hand, when the engine is operated under low load condition, the opening of the throttle valve is controlled to be relatively larger and the control valves 24, 25 and 26 are opened. As a result, since the mixture gas is transferred between the engine sections 5, 6 and 7 through the communicating passages 21, 22 and 23, as hereinafter described, the larger amount of mixture gas is introduced into the engine sections in which the intake stroke is proceeding to lower the negative pressure therein and any excess of mixture gas in the engine sections in which the compression stroke is proceeding is discharged to other engine sections. Such operation occurs in the engine sections 5, 6 and 7 successively as the rotors 8, 9 and 10 rotate with 120 degrees phase difference each other.

The operation mode of the intake system under the low load condition will be hereinafter described in detail based upon FIG. 3.

Figure 3A:
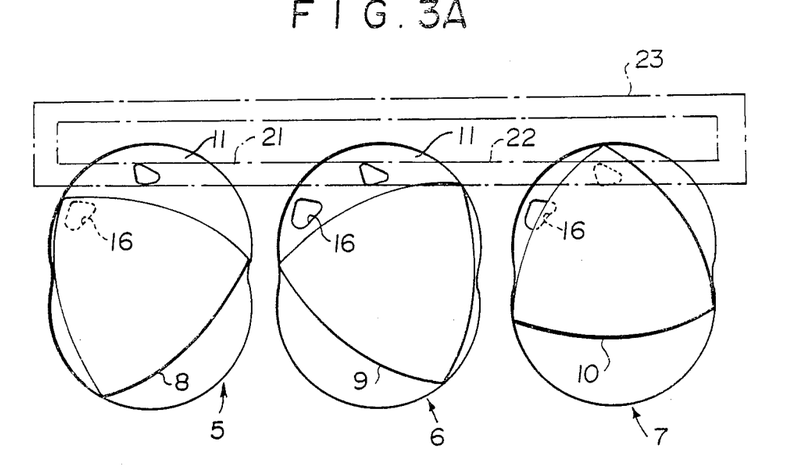
FIGS. 3A to 3D are schematic drawings showing the operation mode of each rotor housing in the embodiment of the present invention shown in FIG. 1.
Figure 3B:
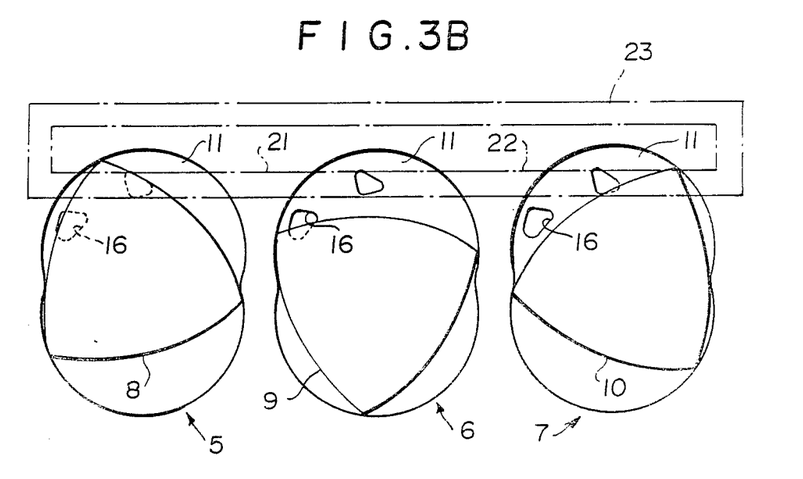

First of all, as shown in FIG. 3A, when the rotor 8 of the first engine section 5 closes the intake port 16 and the compression stroke begins in the first engine section 5, since the rotors 8, 9 and 10 are 120-degree out of phase, the third communicating passage 23 is closed by the rotor 10 of the third engine section 7, but the first communicating passage 21 communicates the working chamber 11 in which the compression stroke is proceeding in the first engine section 5 with the working chamber 11 in which the intake stroke is proceeding in the second engine section 6. While the first communicating passage 21 is opened, the above communication between the first engine section 5 and the second engine section 6 is maintained and the excess of mixture gas in the working chamber 11 in which the compression stroke is proceeding in the first engine section 5 is discharged into the working chamber 11 in which the intake stoke is proceeding in the second engine section 6 through the first communicating passage 21. After the first communicating passage 21 is closed by the rotor 8 as shown in FIG. 3B, the compression of the mixture gas in the working chamber 11 in the first engine section begins. Just before the first communicating passage 21 is closed, the third communicating passage 23 is partly opened and, as a result, the mixture gas is discharged from the first engine section 5 into the third engine section 7 as shown in FIG. 3B.

Figure 3C:
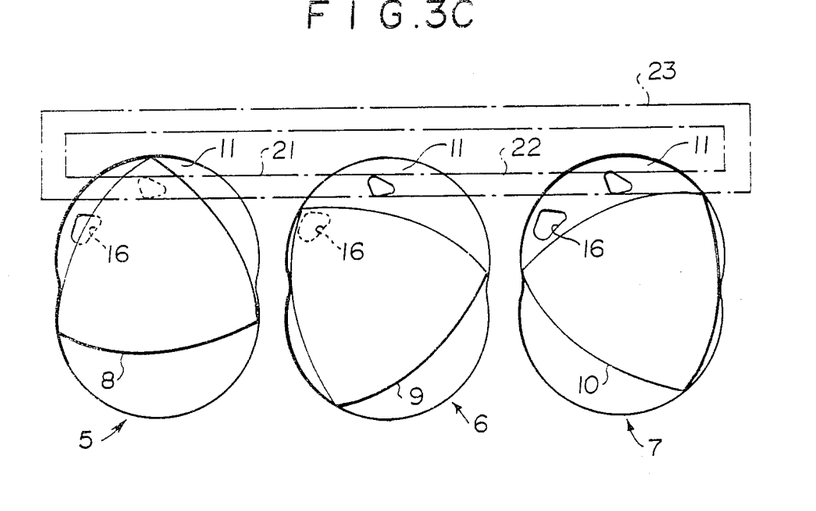
Figure 3D:
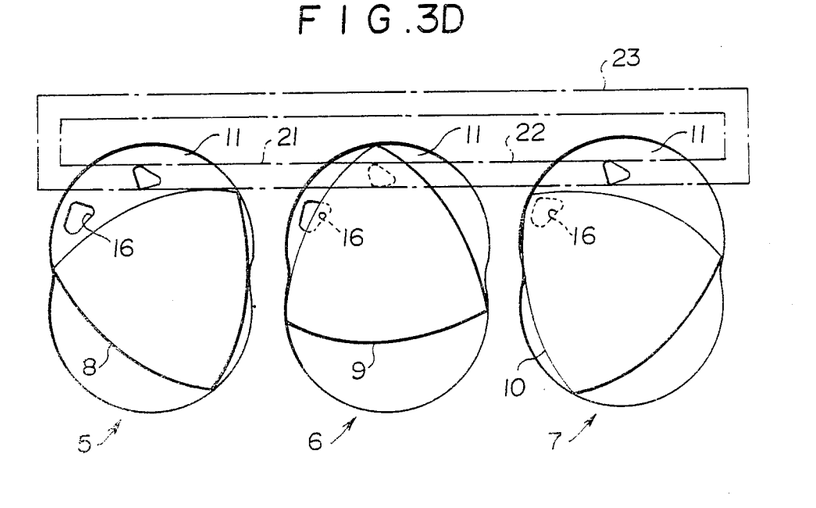

Then, when the rotor 9 of the second engine section 6 closes the intake port 16 and the compression stroke begins in the second engine section as shown in FIG. 3C, the first communicating passage 21 is closed by the rotor 8 of the first engine section 5, but the second communicating passage 22 communicates the working chamber 11 in which the compression stroke is proceeding in the second engine section 6 with the working chamber 11 in which the intake stroke is proceeding in the third engine section 7. Further, when the rotor 10 of the third engine section 7 closes the intake port 16 and the compression stroke begins in the third engine section 7, the second communicating passage 22 is closed by the rotor 9 of the second engine section 6, but the third communicating passage 23 communicates the working chamber 11 in which the compression stroke is proceeding in the third engine section 7 with the working chamber 11 in which the intake stroke is proceeding in the first engine section 5. Consequently, while the compression stroke is proceeding in the second engine section 6, the excess of mixture gas in the working chamber 11 of the second engine section 6 in which the compression stroke is proceeding is discharged into the working chamber 11 of the third engine section 7 in which the intake stroke is proceeding through the second communicating passage 22 and while the compression stroke is proceeding in the third engine section 7, the excess of mixture gas in the working chamber 11 of the third engine section 7 in which the compression stroke is proceeding is discharged into the working chamber 11 of the first engine section 5 in which the intake stroke is proceeding through the third communicating passage 23.

As described above, since the mixture gas can be introduced into each of the engine sections 5, 6 and 7 in which the intake stroke is proceeding from the intake port 16 and another engine section under the same condition and the excess of mixture gas can be discharged from each of the engine sections 5, 6 and 7 in which the compression stroke is proceeding to another engine section under the same condition, the negative pressure of intake air can be lowered to reduce the pumping loss and, further, the same amount of the mixture gas can be drawn into each of the engine sections 5, 6 and 7. Furthermore, since the same amount of the mixture gas is introduced into each of the engine sections 5, 6 and 7 from another engine section, the same amount of intake air can be sucked into each of the engine sections, 5, 6 and 7 and, therefore, the amount of fuel to be injected can be controlled without any difficulty.

Figure 4:
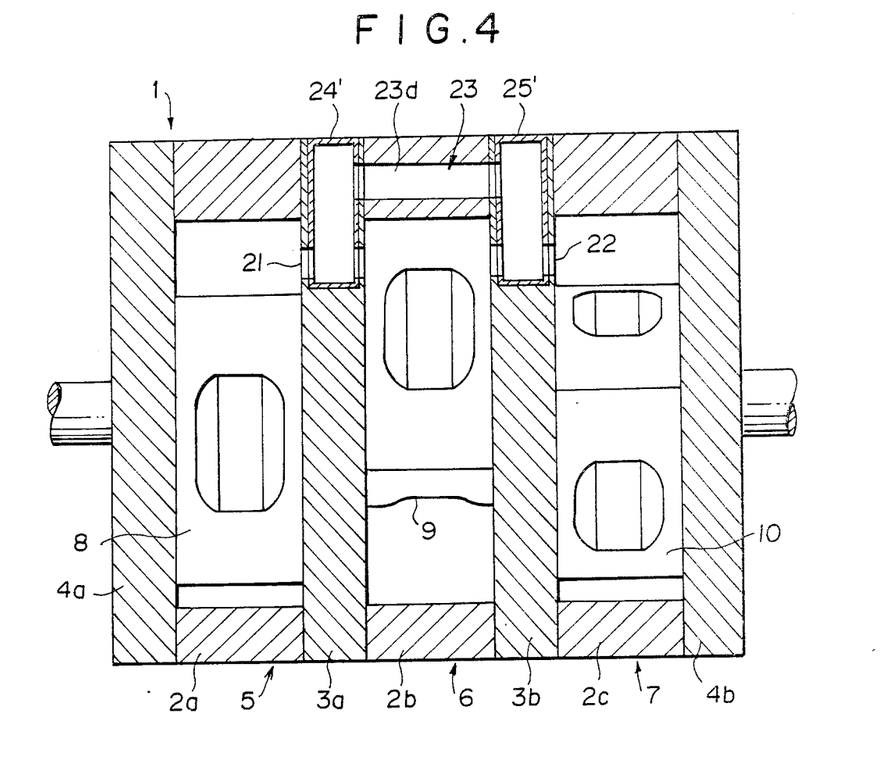
FIG. 4 is a schematic drawing showing a longitudinal cross-sectional view of a rotary piston engine having an intake system which is an another embodiment of the present invention.

FIG. 4 shows a three-rotor type rotary piston engine having an intake system which is another embodiment of the present invention and in which the third communicating passage 23 is located within the casing 1. More specifically, a crooked passage 23d is formed within the rotor housing 2b arranged between the intermediate housings 3a and 3b so that it is connected to the first communicating passage 21 at one end thereof and connected to the second communicating passage 22 at the other end thereof, and the crooked passage 23d, a part of the first communicating passage 21 and a part of the second communicating passage 22 constitute the third communicating passage 23. There are provided in each of the intermediate housings 3a and 3b cylindrical control valves 24' and 25' for controlling the opening of the third communicating passage 23 so as to open or close it at the same time that the first communicating passage 21 and the second communicating passage 22 are opened or closed.

According to this embodiment, while the compression stroke is proceeding, although the rotor 9 closes both the first communicating passage 21 and the second communicating passage, the passage 23d communicates the opening of the second communicating passage 22 which opens to the third engine section 7 and the opening of the first communicating passage 21 which opens to the first engine section 5. Therefore, the same effects can be obtained in this embodiment as those obtained in the previous embodiment shown in FIG. 1. In addition to the effects obtained in the previous embodiment, according to this embodiment, since the length of the third communicating passage 23 can be shortened, it is possible to reduce the pressure loss through the third communicating passage 23 and since the third communicating passage 23 is not located outside of the casing 1, it is easy to lay it out and the mixture gas is prevented from leaking outside.

Figure 5:
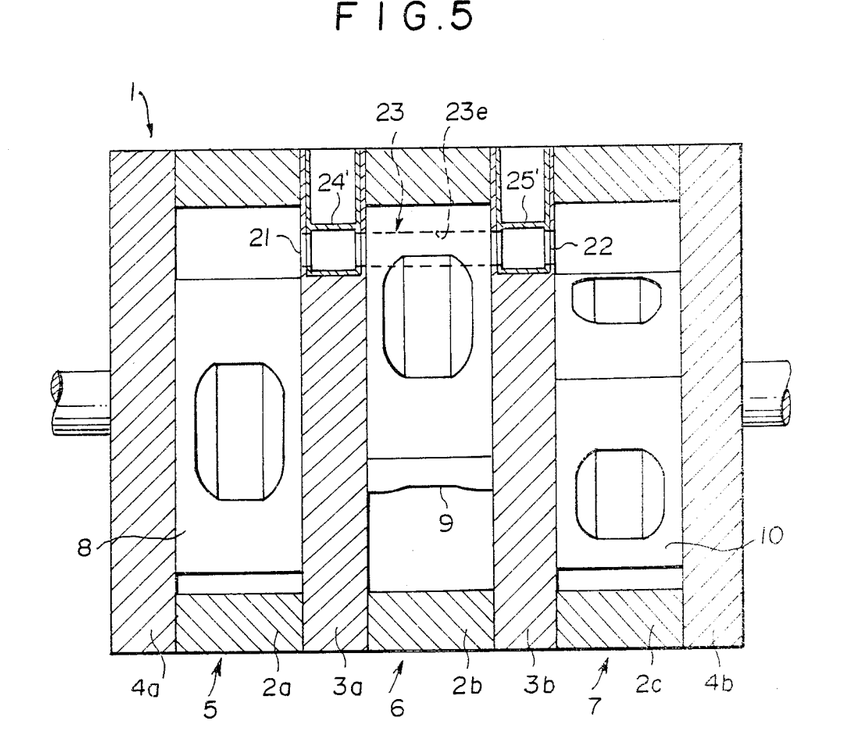
FIG. 5 is a schematic drawing showing a longitudinal cross-sectional view of a rotary piston engine having an intake system which is another embodiment of the present invention.

FIG. 5 shows a three-rotor type rotary piston engine having an intake system which is another embodiment of the present invention and in which holes 23e are formed within the rotor 9 of the second engine section 6 so that their axes are parallel with the output shaft and in which one of the holes 23e, the first communicating passage 21 and the second communicating passage 22 constitute the third communicating passage 23. More specifically, the rotor 9 is formed with the holes 23e located in the vicinity of the respective apices thereof so that one of said holes 23e can communicate the openings of the first communicating passage 21 with the second communicating passage 22 while the rotor 9 takes the position where the communication between the first engine section 5 and the second engine section 6 and the communication between the second engine section 6 and the third engine section 7 are cut off respectively.

Figure 6:
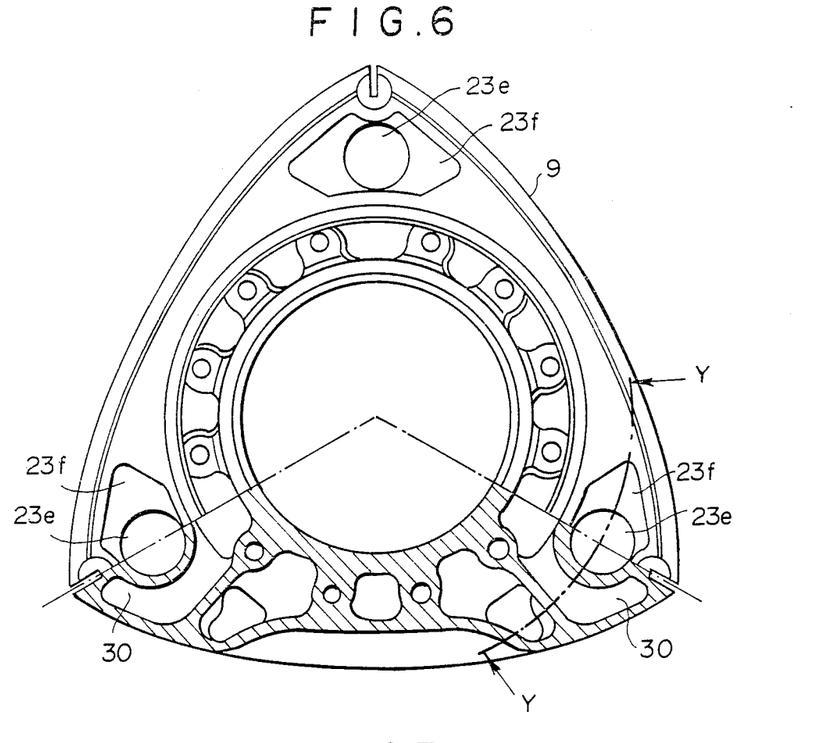
FIG. 6 is a schematic drawing showing a partly enlarged cross-sectional view of the rotor employed in the embodiment shown in FIG. 5.
Figure 7:
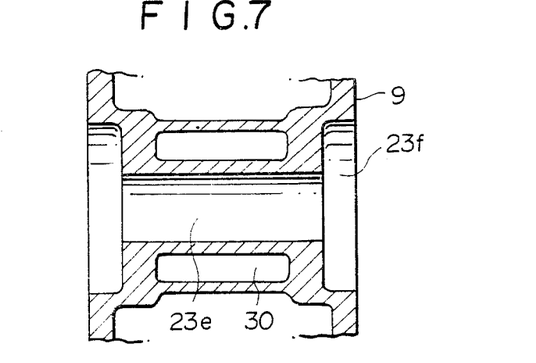
FIG. 7 is a schematic drawing showing a cross-sectional view taken along line Y—Y of FIG. 6.

The cross section of the hole 23e may be uniform over the whole length thereof, but it is preferable that the cross sectional area of the hole 23e be relatively smaller in the intermediate portion than that in both opening portions 23f of the hole 23e so as to be able to arrange a passage 30 for cooling oil close to each of the apex seals 12 and to communicate the hole 23e with the first communicating passage 21 and the second communicating passage 22 for a longer time. In this embodiment, control valves are provided only in the first communicating passage 21 and the second communicating passage 22 is a similar manner to that in the previous embodiment shown in FIG. 4.

Figure 8:
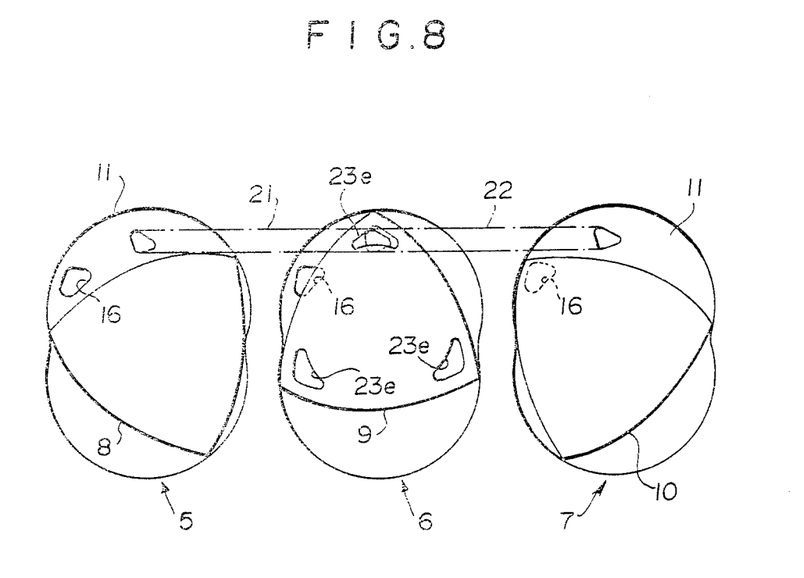
FIG. 8 is a schematic drawing showing the operation mode of each rotor housing in the embodiment of present invention shown in FIG. 5.

According to this embodiment, as shown in FIG. 8, when the compression stroke begins in the third engine section 7 and the rotor 9 cuts off the communication between the first engine section 5 and the second engine section 6 and the communication between the second engine section 6 and the third engine section 7 respectively, the hole 23e communicates the first communicating passage 21 and the second communicating passage 22. As a result, the working chamber 11 of the third engine section 7 in which the compression stroke is proceeding is communicated with the working chamber 11 of the first engine section 5 in which the intake stroke is proceeding. Therefore, according to this embodiment, in addition to the effects obtained in the previous embodiments shown in FIGS. 1 and 4, the length of the third communicating passage 23 can be shorter than that in the previous embodiments.

According to the present invention, since the mixture gas is transferred from the working chamber 11 of one engine section in which the compression stroke is proceeding into the working chamber 11 of another engine section in which the intake stroke is proceeding so that it is respectively transferred from the first engine section 5 to the second engine section 6 through the first communicating passage 21 and from the second engine section 6 to the third engine section 7 through the second communicating passage 22 and from the third engine section 7 to the first engine section 5 through the third communicating passage 23, there can be obtained an intake system for a three-rotor type rotary piston engine capable of reducing the pumping loss in each engine section uniformly and drawing the same amount of the mixture gas from another engine section and the same amount of intake air from the intake port to each engine section.

The present invention has thus been shown and described with reference to specific embodiments. However, it should be noted that the present invention is in no way limited to the details of the described arrangements but changes and modifications may be made without departing from the scope of the appended claims.

What is claimed:

1. An intake system for three-rotor type rotary piston engine comprising first, second and third engine sections, a casing comprised of first, second and third rotor housings each of which is formed with an inner wall of trochoidal configuration, two intermediate housings respectively located between said first rotor housing and said second rotor housing and between said second rotor housing and said third rotor housing and two side housings respectively attached with said first rotor housing and said third rotor housing, each engine section having a rotor of substantially polygonal configuration planetarily rotatable in sliding contact with the inner wall of said rotor housing therein to define working chambers of cyclically variable volumes, the phase of said rotor of the first engine section being advanced relative to that of the second engine section by 120 degrees in terms of the eccentric shaft rotation angle and the phase of said rotor of the second engine section being advanced relative to that of the third engine section by 120 degrees in terms of the eccentric shaft rotation angle so that the intake stroke takes place in the order of the first, second and third engine section, and intake port means for introducing intake air into each engine section, said intake system comprising:

first communicating passage means for communicating the working chamber in which the compression stroke is proceeding in the first engine section and the working chamber in which the intake stroke is proceeding in the second engine section, second communicating passage means for communicating the working chamber in which the compression stroke is proceeding in the second engine section and the working chamber in which the intake stroke is proceeding in the third engine section, and third communicating passage means for communicating the working chamber in which the compression stroke is proceeding in the third engine section and the working chamber in which the intake stroke is proceeding in the first engine section, each communicating passage means being provided with valve means for controlling the openings thereof in accordance with the engine load wherein said first communicating passage means is formed in the intermediate housing between the first rotor housing and the second rotor housing, wherein the second communicating passage means is formed in the intermediate housing between the second rotor housing and the third rotor housing and wherein said third communicating passage means is formed outside of said casing.

2. An intake system in accordance with claim 1 in which each of said valve means is controlled so as to be opened under the low load condition.

3. An intake system in accordance with claim 1 in which said first, second and third communication passage means have openings into the respective engine sections which openings are aligned in the direction of the eccentric shaft.

4. An intake system for three-rotor type rotary piston engine consisting of first, second and third engine sections, a casing comprised of first, second and third rotor housings each of which is formed with an inner wall of trochoidal configuration, two intermediate housings respectively located between said first rotor housing and said second housing and between said second housing and said third housing and two side housings respectively attached with said first rotor housing and said third rotor housing, each engine section having a rotor of substantially polygonal configuration planetarily rotatable in sliding contact with the inner wall of said rotor housing therein to define working chambers of cyclically variable volumes, said rotors being in 120-degree phase difference, and intake port means for introducing intake air into each engine section, said intake system comprising:

first communicating passage means for communicating the working chamber in which the compression stroke is proceeding in the first engine section and the working chamber in which the intake stroke is proceeding in the second engine section, said first communicating passage means being formed in the intermediate housing between the first rotor housing and the second rotor housing, second communicating passage means for communicating the working chamber in which the compression stroke is proceeding in the second engine section and the working chamber in which the intake stroke is proceeding in the third engine section, said second communicating passage means being formed in the intermediate housing between the second rotor housing and the third rotor housing, third communicating passage means for communicating the working chamber in which the compression stroke is proceeding in the third engine section and the working chamber in which the intake stroke is proceeding in the first engine section, said third communicating passage means comprising said first communicating passage means, said second communicating passage means and a crooked passage provided in the second rotor housing and communicating said first communicating passage means with said second communicating passage means, and valve means for controlling the openings of said first communicating passage means and said second communicating passage means in accordance with the engine load, said valve means being provided in the first communicating passage means and the second communicating passage means respectively.

5. An intake system in accordance with claim 4 in which each of said valve means is controlled so as to be opened under low load condition.

6. An intake system for three-rotor type rotary piston engine consisting of first, second and third engine sections, a casing comprised of first, second and third rotor housings each of which is formed with an inner wall of trochoidal configuration, two intermediate housings respectively located between said first rotor housing and said second housing and between said second housing and said third housing and two side housings respectively attached with said first rotor housing and third rotor housing, each engine section having a rotor of substantially polygonal configuration planetarily rotatable in sliding contact with the inner wall of said rotor housing therein to define working chambers of cyclically variable volumes, said rotors being in 120-degree phase difference, and intake port means for introducing intake air into each engine section, said intake system comprising:

first communicating passage means for communicating the working chamber in which the compression stroke is proceeding in the first engine section and the working chamber in which the intake stroke is proceeding in the second engine section, said first communicating passage means being formed in the intermediate housing between the first rotor housing and the second rotor housing, second communicating passage means for communicating the working chamber in which the compression stroke is proceeding in the second engine section and the working chamber in which the intake stroke is proceeding in the third engine section, said second communicating passage means being formed in the intermediate housing between the second rotor housng and the third rotor housing, said first communicating passage means and said second communicating passage means being located at substantially the same position with respect to the longitudinal direction of an output shaft, third communicating passage means for communicating the working chamber in which the compression stroke is proceeding in the third engine section and the working chamber in which the intake stroke is proceeding in the first engine section, said third communicating passage means being constituted by said first communicating passage means, said second communicating passage means and one of a plurality of holes provided through said rotor of the second engine section in the vicinity of respective apex portions thereof, each of said holes being capable of communicating the first communicating passage means and the second communicating passage means, its axis being parallel with the output shaft, and valve means for controlling the openings of the first communicating passage means and the second communicating passage means, said valve means being provided in the first communicating passage means and the second communicating passage means respectively.

7. An intake system in accordance with claim 6 in which each of said valve means is controlled so as to be opened under low load condition.

8. An intake system in accordance with claim 6 in which the cross sectional area of said hole is formed so that it is smaller in the intermediate portion than that at end portions.

9. An intake system in accordance with claim 8 in which each of said valve means is controlled so as to be opened under low load condition.

* * * * *